May 7, 1957
R. ARNAUD
2,791,673
PROCESS AND DEVICE FOR ELECTRIC ARC WELDING
IN A PROTECTIVE ATMOSPHERE
Filed Feb. 23, 1955
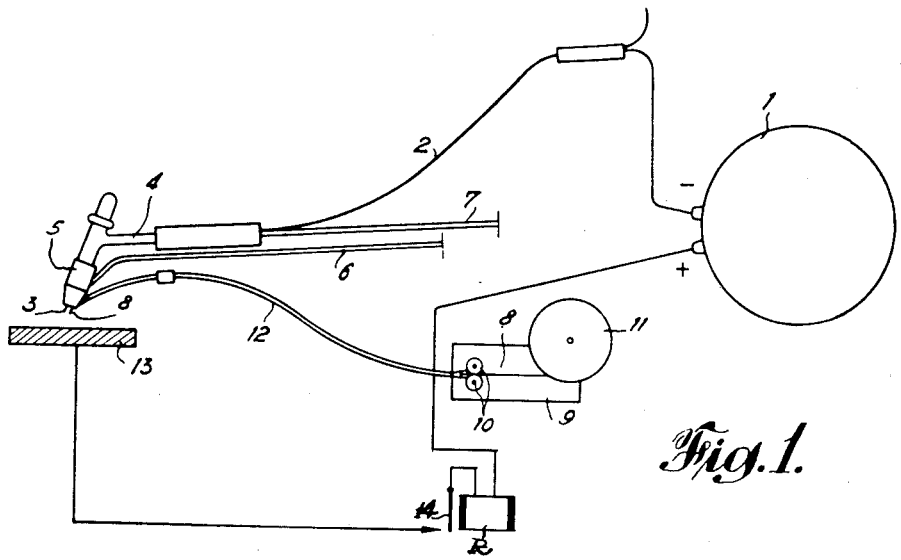
Fig.1.
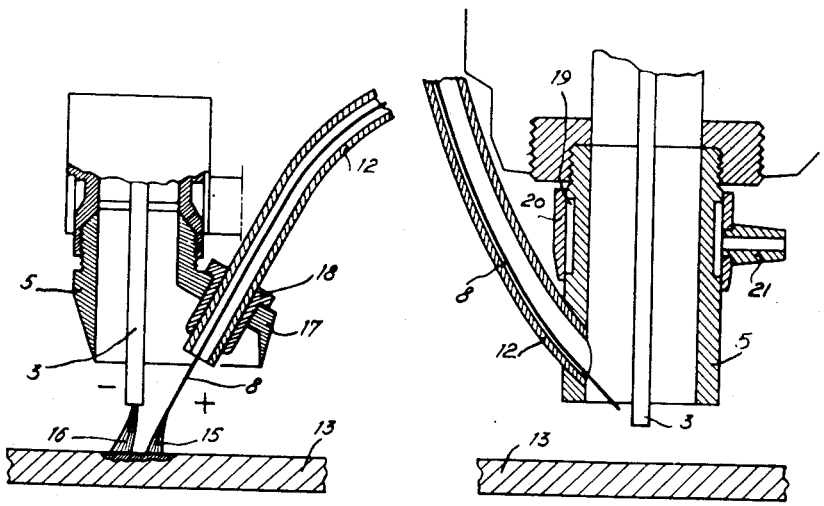
Fig.2.
Fig.3.
INVENTOR.
ROBERT ARNAUD
BY
Barnwell R. King
ATTORNEY

United States Patent Office 2,791,673
Patented May 7, 1957

2,791,673

PROCESS AND DEVICE FOR ELECTRIC ARC WELDING IN A PROTECTIVE ATMOSPHERE

Robert Arnaud, Boulogne-sur-Seine, France, assignor to L'Air Liquide, Societe Anonyme pour l'Etude et l'Exploitation des Procedes Georges Claude, Paris, France Application February 23, 1955, Serial No. 490,074

Claims priority, application France May 25, 1954

5 Claims. (Cl. 219—74)

The present invention relates to the technique of electric arc welding in a protective atmosphere, especially an argon atmosphere, in which the arc is maintained between the workpiece to be welded and a non-fusible electrode, for instance of tungsten, a fusible metal rod or wire being advanced into the arc to constitute the filler metal to be added in the weld pool.

The invention proposes to improve such technique in order in particular to increase the amount of heat given off in the welding zone for a given no-load voltage of the generator.

For this purpose, the invention consists in utilizing two welding arcs in series, in the same feed circuit, extending between the workpiece to be welded and a non-fusible electrode on the one hand, and an electrode made of the fusible metal to be deposited on the other hand, respectively, these two electrodes being sufficiently close to one another so that a single weld pool is formed on the workpiece to be welded.

The invention can be carried out either with direct current or with alternating current, and with respect to the method for carrying it out, it is characterized in particular by the following main points, which furthermore can be applied either individually or in combination:

1. When direct current is used the non-fusible electrode is connected to the negative pole of the current source, for instance, a generator, and the fusible electrode is connected to the positive pole of the same source.

2. For striking the arc, the workpiece to be welded is connected to the positive pole of the D. C. source, and only the arc of the non-fusible electrode is struck and, after this arc has been produced, the connection between the workpiece and the source is interrupted.

3. The interruption of the connection between the workpiece and the positive pole of the source is effected automatically by a relay energized by the passage of current in the fusible electrode.

4. A welding torch for the carrying out of the invention comprises a nozzle which can be of the usual type for argon arc welding torches with non-fusible electrode, with or without water cooling, but adapted to be connected to a tube for guiding and feeding a metal wire which constitutes the fusible electrode or filler metal.

The attached drawing shows, solely by way of example, various embodiments for the carrying out of the invention.

Fig. 1 is a diagrammatic view of an entire welding station in accordance with the invention; and Figs. 2 and 3 are axial sections through nozzles of argon welding torches adapted for the use of the welding process according to the invention.

The welding unit shown in Fig. 1 uses as welding current the direct current supplied by a generator 1, the negative pole of which is connected by a flexible conductor 2 to the non-fusible electrode 3 of an argon welding torch 4 provided with a nozzle 5, for instance of copper, and cooled by water circulation, the feed and return pipes of which are assumed arranged in one and the same flexible sheathing 6. The argon is brought to the inside of the nozzle 5 through a tube 7.

In accordance with the invention, a fusible electrode consisting of a wire 8 of the filler metal is guided in the nozzle 5 in such a manner that its end is near the end of the non-fusible electrode 3, as can be noted from Fig. 2. As the wire 8 is consumed, it is advanced at a suitable rate regulated by a suitable mechanism shown at 9 in the diagram of Fig. 1, and provided, for instance, with two rollers 10, which draw the wire 8 from a reel 11, and push it into a flexible conductive sheathing 12 connected to the nozzle 5. This sheathing can be used to conduct the welding current to the wire 8 which, in accordance with the invention, must be connected to the positive pole of the source 1. In the diagram of Fig. 1, this pole is connected to the sheathing 12.

For striking the arc, the part or piece 13 to be welded is connected also to the positive pole of the source 1 by closing a switch 14, which can be opened either manually or automatically by a suitable relay R which is energized when the welding current passes through the sheathing 12 and the wire 8.

In order to strike the arc, the switch 14 is closed, and the arc struck only with the non-fusible electrode 3. Even if the electrodes 3 and 8 are very close together, an arc will not be produced between them. When a pool of fused metal is formed on the part 14, the mechanism 9 for the displacement of the wire 8 is placed into operation; when the wire touches the part 13, the switch 14 is opened and two arcs 15 and 16 (Fig. 2) are formed which are, in principle, distinct from each other.

The process which has just been described has the advantage of making the best use of the D. C. welding generator; the total voltage of the two arcs 15 and 16 being greater than that of a single arc, the amount of heat given off is greater for one and the same no-load voltage of the generator. Furthermore, this heat is distributed better since the non-fusible electrode 3 is at the negative pole where the least heat is given off and the fusible electrode 8 is at the positive pole where the most heat is given off.

The pool obtained on the part to be welded is spread out more than in the case of a single arc, which favors de-gassing.

When the welding current is alternating current, a high frequency is preferably superimposed, in the known manner, on this welding current.

Fig. 2 shows a manual torch nozzle modified for use with the invention. The nozzle 5, for instance of copper, has a lateral projection 17, on which a connection 18 fastens the conductive sheathing 12 for the guiding and feeding of the wire 8, which constitutes the fusible electrode. The nozzle of Fig. 3 is suitable for a torch for an automatic welding machine. The fusible electrode 8 discharges obliquely into the wall of the metal nozzle 5, cooled by water circulation in the cavity 19, closed by a jacket 20, to which a water inlet is connected at 21.

The same reference numbers designate the same members and parts in all the figures of the drawing.

I claim:

1. Method of electric arc welding in an atmosphere of protective gas, characterized by the fact that it consists in utilizing two welding arcs in series in the same feed circuit, extending respectively between the part to be welded and a non-fusible electrode on the one hand, and an electrode of the fusible metal to be deposited on the other hand, such two electrodes being sufficiently close to one another so that only a single weld pool is formed on such part to be welded.

2. Method of carrying out the process according to claim 1, characterized by the fact that when direct current is used, the non-fusible electrode is connected to the negative pole of the current source, for instance a generator, and the fusible electrode is connected to the positive pole of the same source.

3. Method of carrying out the process according to claim 2, characterized by the fact that for the striking of the arc, the part to be welded is connected to the positive pole of the D. C. source, and only the arc of the non-fusible electrode is struck and, after such arc has been produced, the connection between such part and the source is interrupted.

4. Method of carrying out the process according to claim 3, characterized by the fact that the interrupting of the connection between such part to be welded and the positive pole of the source is produced automatically by a relay energized by the passage of the current in the fusible electrode.

5. In a gas shielded arc welding torch, the combination with a non-consumable electrode-gun having a shielding gas discharge nozzle provided with a side opening, of a conductive sheathing terminating at said opening, means for feeding a consumable electrode-filler wire through said sheathing into said nozzle, and circuit means for connecting said consumable and non-consumable electrodes to the opposite sides of a common source of welding current, the ends of said electrodes being arranged to melt a common pool of metal to be welded by separate arcs, one fusible electrode metal (wire) arc and one refractory-electrode arc, under a common stream of shielding gas which flows through said nozzle.

References Cited in the file of this patent

UNITED STATES PATENTS

| | | |
|---|---|---|
| 1,371,094 | Holslag | Mar. 8, 1921 |
| 1,911,033 | Nagashev | May 23, 1933 |
| 2,008,846 | Zack | July 23, 1935 |
| 2,468,808 | Drake | May 3, 1949 |
| 2,475,357 | Miller | July 5, 1949 |
| 2,571,684 | Craven | Oct. 6, 1951 |

FOREIGN PATENTS

| | | |
|---|---|---|
| 439,520 | Great Britain | Dec. 9, 1935 |